United States Patent
Fulks

(10) Patent No.: US 10,502,975 B2
(45) Date of Patent: Dec. 10, 2019

(54) EYEGLASS RETAINER

(71) Applicant: Clayton M. Fulks, Hendersonville, TN (US)

(72) Inventor: Clayton M. Fulks, Hendersonville, TN (US)

( * ) Notice: Subject to any disclaimer, the term of this patent is extended or adjusted under 35 U.S.C. 154(b) by 16 days.

(21) Appl. No.: 15/981,158

(22) Filed: May 16, 2018

(65) Prior Publication Data

US 2018/0335640 A1     Nov. 22, 2018

Related U.S. Application Data

(60) Provisional application No. 62/507,546, filed on May 17, 2017.

(51) Int. Cl.
*G02C 3/00*     (2006.01)
*G02C 5/14*     (2006.01)

(52) U.S. Cl.
CPC ............. *G02C 3/006* (2013.01); *G02C 5/14* (2013.01); *G02C 5/143* (2013.01); *G02C 2200/02* (2013.01)

(58) Field of Classification Search
CPC ...... G02C 3/003; G02C 5/14; G02C 2200/02; G02C 2200/24; G02C 3/006; G02C 3/02
USPC .......................................... 351/123, 156, 157
See application file for complete search history.

(56) References Cited

U.S. PATENT DOCUMENTS

| | | | |
|---|---|---|---|
| 4,479,703 A | * | 10/1984 | Enghofer ............... G02C 3/003 351/117 |
| 6,547,388 B1 | | 4/2003 | Bohn |
| 6,905,206 B2 | | 6/2005 | Skuro |
| 7,159,978 B2 | | 1/2007 | Skuro |
| 2016/0025998 A1 | | 1/2016 | Ruhland et al. |

* cited by examiner

*Primary Examiner* — Hung X Dang
(74) *Attorney, Agent, or Firm* — Bryan W. Bockhop; Bockhop Intellectual Property Law, LLC

(57) ABSTRACT

In an eyeglass retainer system for use with eyeglasses having a frame front that includes a pair of eyeglass temples, each temple has a first end for securing the temple to frame front and an opposite second end. Each temple defines an elongated channel passing therethrough and opening to the second end. Two cords are each disposed within the channel defined by a different one of the temples and extend out from the second end. Each chord is extendable from the channel and retractable into the channel. Two magnetic connectors are each affixed to a different one of the cords. The two magnetic connectors have opposite polarities so as to attract each other when placed against to each other. A stopping mechanism prevents the chord from exiting the hole completely.

18 Claims, 4 Drawing Sheets

EYEGLASS RETAINER

CROSS-REFERENCE TO RELATED APPLICATION(S)

This application claims the benefit of U.S. Provisional Patent Application Ser. No. 62/507,546, filed May 17, 2017, the entirety of which is hereby incorporated herein by reference.

BACKGROUND OF THE INVENTION

1. Field of the Invention

The present invention relates to eyeglass retainers and, more specifically, to an eyeglass retainer that is retractable.

2. Description of the Related Art

Eyeglass retainers are used by wearers of eyeglasses (typically sunglasses and reading glasses) to hold the eyeglasses suspended from the wearer's neck when the eyeglasses are not being worn. Typical eyeglass retainers include a cord or chain having loops at both ends to engage the temples of the eyeglasses. Such retainers remain in view even when the eyeglasses are being worn by the user, which some users feel can be unsightly or unfashionable.

Several eyeglass retainers that are hidden when the eyeglasses are being worn have been proposed. Such retainers typically employ spring-loaded take-up reels hidden in a hollowed-out portion of one or more of the temples. The retainer is pulled out when the user desires its use and then pushed back in when the eyeglasses are to be worn. Such proposed retainers have not been widely produced because they require complex mechanical systems that add weight and bulk to the temples, and that add cost to the eyeglasses.

Therefore, there is a need for a mechanically simple eyeglass retainer system.

SUMMARY OF THE INVENTION

The disadvantages of the prior art are overcome by the present invention which, in one aspect, is an eyeglass retainer system for use with eyeglasses having a frame front that includes a pair of eyeglass temples. Each temple has a first end for securing the temple to frame front and an opposite second end. Each temple defines an elongated channel passing therethrough and opening to the second end. Two cords are each disposed within the channel defined by a different one of the temples and extend out from the second end. Each chord is extendable from the channel and retractable into the channel. Two magnetic connectors are each affixed to a different one of the cords. The two magnetic connectors have opposite polarities so as to attract each other when placed against to each other. A stopping mechanism prevents the chord from exiting the hole completely.

In another aspect, the invention is an eyeglass retainer system for use with eyeglasses having a frame front that includes a pair of eyeglass temples. Each temple has a first end for securing the temple to frame front and an opposite second end. Each temple defines an elongated channel passing therethrough and opening to the second end. Two cords are each disposed within the channel defined by a different one of the temples and extend out from the second end. Each chord is extendable from the channel and retractable into the channel. Two magnetic connectors are each affixed to a different one of the cords. The two magnetic connectors have opposite polarities so as to attract each other when placed against to each other. Two magnetic holding pieces are each affixed to the second end of a different one of the temples. Each holding piece defines a hole that is contiguous with the channel passing therethrough. The magnetic holding pieces are configured to attract the magnetic connectors when placed adjacently thereto. A stopper is affixed to a distal end of the cord and that has a diameter. A hole is defined by the magnetic holding piece. The hole has a diameter that is smaller than the diameter of the stopper.

In yet another aspect, the invention is an eyeglass retainer system for use with eyeglasses having a frame front and a pair of eyeglass temples in which each temple has a first end hingedly secured to the frame front and an opposite second end. Two cords each have a proximal end and an opposite distal end. An attachment mechanism selectively secures the proximal end of each cord to a different second end of each temple. Two magnetic connectors are each affixed to the distal end of a different one of the cords. The two magnetic connectors are configured to be secured to each other by magnetic attraction.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1A:
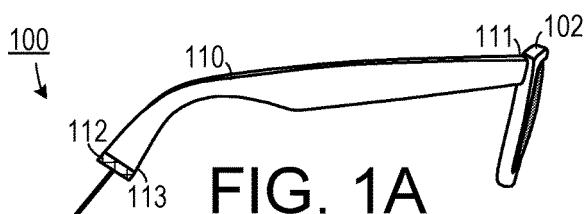
FIG. 1A is a side view of one embodiment of a pair of eyeglasses that includes a retainer in an extended state.

A preferred embodiment of the invention is now described in detail. Referring to the drawings, like numbers indicate like parts throughout the views. Unless otherwise specifically indicated in the disclosure that follows, the drawings are not necessarily drawn to scale. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Figure 1B:
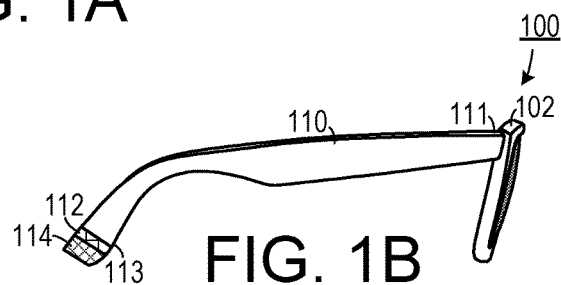
FIG. 1B is a side view of the embodiment shown in FIG. 1B in which the retainer is in a retracted state.

As shown in FIG. 1A, one embodiment of an eyeglass retainer system 100 includes a pair of eyeglasses that have a frame front 102 and a pair of temples 110 secured thereto. Each temple 110 has a first end 111 hingedly secured to the frame front 102 and an opposite second end 113. Each temple member 110 includes a retractable cord 116 (which could include: a traditional fiber cord, a metal cable, a plastic cable, a silicon cord, a leather cord, a sailing rope, and combinations thereof) that is terminated by a magnetic connector 114. When the cord 116 is retracted, as shown in FIG. 1B, the magnetic connector 114 is held in place with a complementary magnetic holding piece 112 (which could be a non-magnetic ferrous metal or a magnet) that is affixed to the end of the temple member 110, thereby giving the appearance of normal eyeglasses. In an alternate embodiment, the magnetic connector 114 could be held against the second end 113 by an extension of the temple 110 that clicks into a notch in the magnetic connector 114. The temple members 110 can be made from any materials commonly used in making eyeglass temples (including plastics, metals, etc.) and can be made from any process known in the art of manufacturing eyeglass temples (including injection molding, machining, etc.).

Figure 2A:
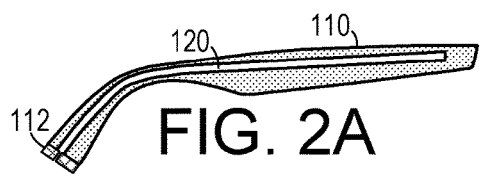
FIGS. 2A-2C are cut-away schematic views of a temple member employing the embodiment shown in FIGS. 1A-1B.
Figure 2B:
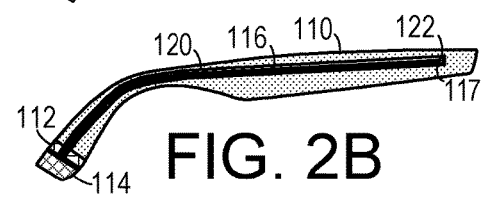
Figure 2C:
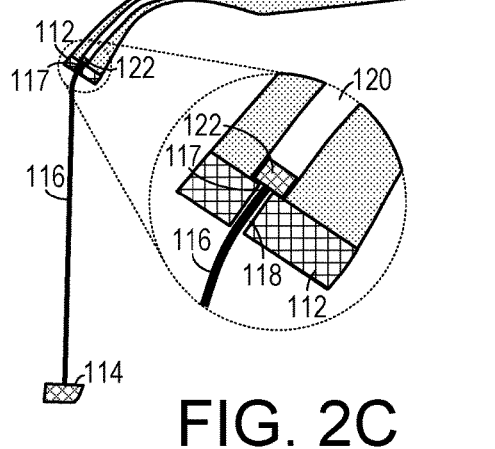

As shown in FIGS. 2A-2C, the temple member 110 defines an internal channel 120 that receives the cord 116, having a distal end 117, therein. The distal end 117 of the cord 116 that is opposite from the magnetic connector 114 terminates in a stopper 122 that is larger than a restriction near the end of the temple member 110. The restriction can take the form, for example, of the channel 120 narrowing as it passes through the magnetic holding piece 112 or it could be in the form of a detent (not shown) that is integrally formed in the temple member 110 or a hole 118 that has a smaller diameter than that of the stopper 122 so that the cord 116 is prevented from fully exiting the channel 120.

Figure 3A:
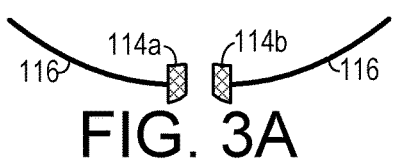
FIG. 3A-3B are schematic diagrams that illustrate use of the magnetic connectors.
Figure 3B:
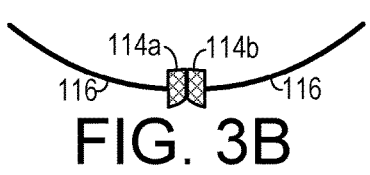

As shown in FIGS. 3A-3B, in using the retainer system, the cords 116 are pulled out from the channels defined by each temple member and the magnetic connectors 114a and 114b are placed together. The polarity of magnetic connector 114a is opposite that of magnetic connector 114b to cause them to be held together. In embodiments designed for use in highly active environments, the magnetic connectors 114 include rare earth magnets to insure secure holding. In embodiments designed for use in less active environments, less powerful magnets may be used. The magnetic connectors 114 can be rubberized or plasticized to provide a better gripping surface and surface texture can be added to the connectors 114 to facilitate gripping.

Figure 4A:
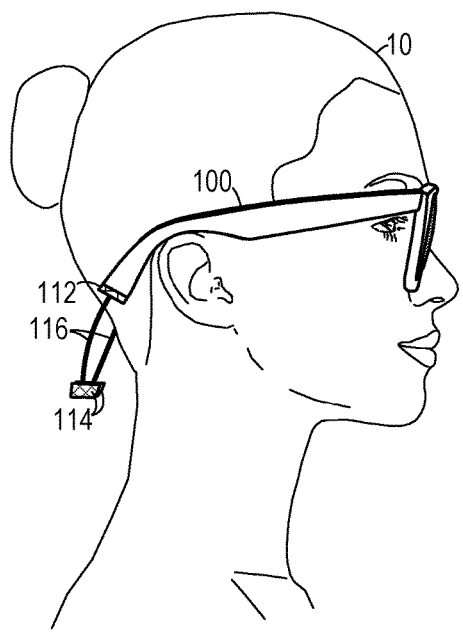
FIG. 4A-4B are schematic diagrams that illustrate a retainer system in use.
Figure 4B:
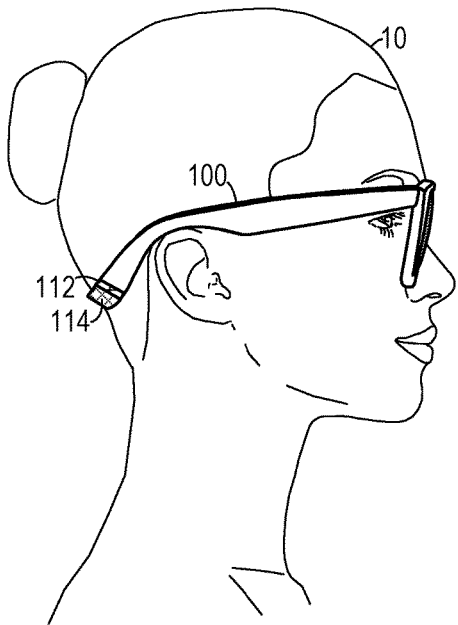

A person 10 wearing the retainer system 100 with the cords 116 employed is show in FIG. 4A. The retainer system 100 with the cords hidden is show in FIG. 4B.

Figure 5:
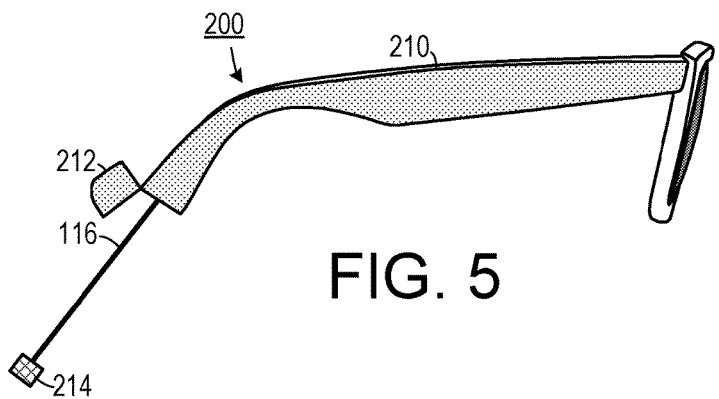
FIG. 5 is a schematic diagram of a second embodiment of a retainer system.

As shown in FIG. 5, one embodiment of a retainer system 200 employs a temple member 210 that terminates with a hinged end cap 212 into which fits the magnetic connector 214 when not in use. This embodiment can provide a somewhat more natural look in certain configurations. In other embodiments, the end cap can be fitted with a sliding door through which the connector can exit. Also, a sliding lock can be used to allow the cord to be removed completely from the temple member.

Figure 6:
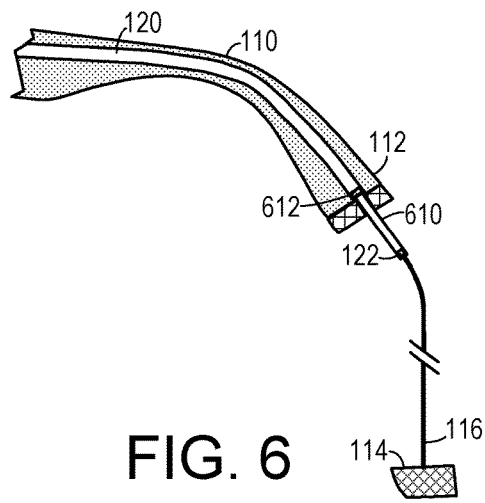
FIG. 6 is a schematic diagram of an embodiment for extending the cord length.
Figure 7:
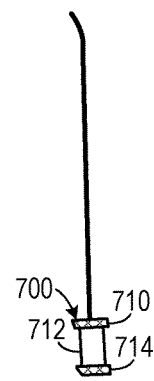
FIG. 7 is a schematic diagram of a second embodiment for extending the cord length.

As shown in FIG. 6, the temple member 110 can be fitted with a tubular extender 610 that fits into the channel 120 and that has an end stop 612. The cord 116 fits into the tubular extender 610. When the cord 116 is pulled out of the channel 120, the extender is also pulled out, thereby lengthening the effective reach of the cord 116. In the alternative, the effective reach can be accomplished by placing extended connectors 700 at the end of one or both of the cords. An extended connector 700 would include a first magnet 710 that is attachable to the magnetic holding piece 112, a spacer 712 and a magnetic connector 714 affixed to the spacer 712.

Figure 8A:
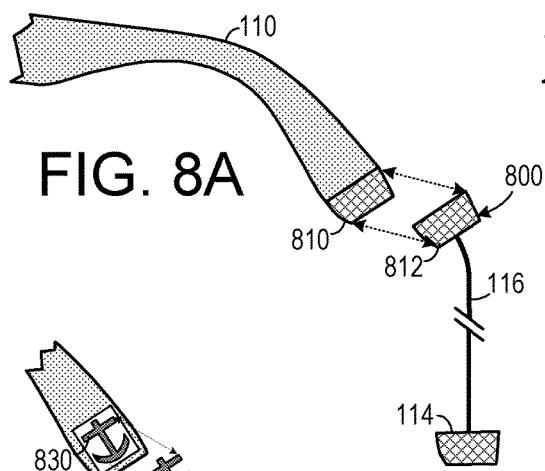
FIGS. 8A-8C are schematic diagrams of an embodiment that can be applied to existing glasses.
Figure 8B:
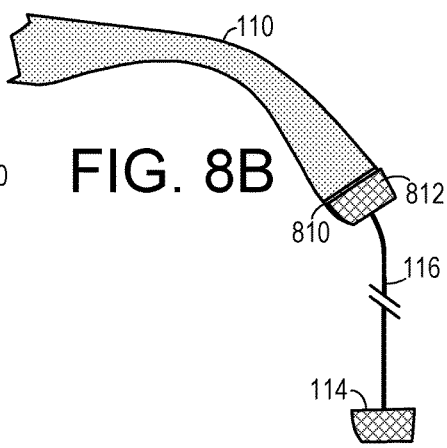
Figure 8C:
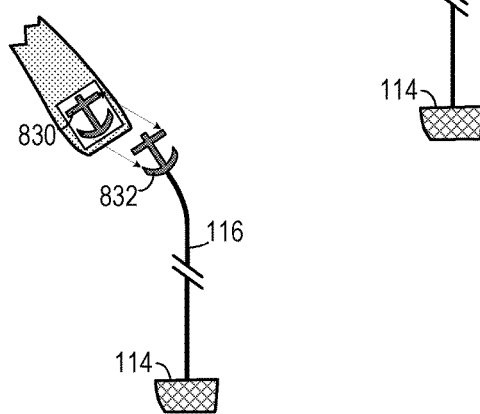

One embodiment of a retainer strap can be used for any sunglasses. It includes a self-adhesive magnet that affixes to the terminal end of the temple arm to any sunglasses. (Alternately, the magnet can be glued or attached to the temple with a fastener.) The strap/cable consists of a similar magnet, but a "female version" for secure connection in the same angulation every time and the same terminal magnet as my other sunglasses for magnetic connection in the back. These straps can be made out of one of many different materials, including but not limited to: cable, metal, plastic, monofilament, rope, sailing rope, leather, silicone, nylon, neoprene, etc. They can also be made to different lengths. In this embodiment, which is shown in FIGS. 8A and 8B, an attachable unit 800 can be employed for use with existing glasses. The attachable unit 800 includes a magnetic tab 810 that can be affixed to an existing temple 110 (e.g., with a pressure sensitive adhesive previously applied to the magnetic tab 810). The cord 116 has an end magnet 812 for attachment to the magnetic tab 810. As shown in FIG. 8C, the tab can define a recessed shape 830 and the end magnet 832 can have a shape that is complementary to the recessed shape 830 so that at least a portion of which will fit therein, thereby facilitating more positive engagement. The cords can be offered in multiple sizes to accommodate the preferences of different users. For example, some users might prefer a 10" cord length, others might prefer a 12" cord length, while others might prefer a 14" cord length.

Figure 9:
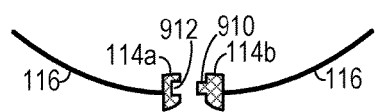
FIG. 9 is a schematic diagram of complementary connectors.

In one embodiment, as shown in FIG. 9, the magnetic connectors 114a and 114b can be fit with complementary shapes 910 and 912 (such as a protuberance and an indentation that is complementary in shape to the protuberance, as shown) that ensure more positive engagement.

Figure 10A:
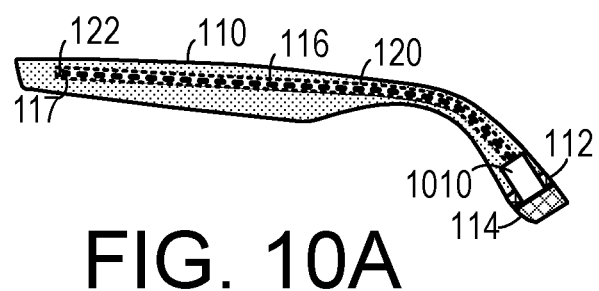
FIGS. 10A-10B are schematic diagrams of an embodiment that include a cord release mechanism.
Figure 10B:
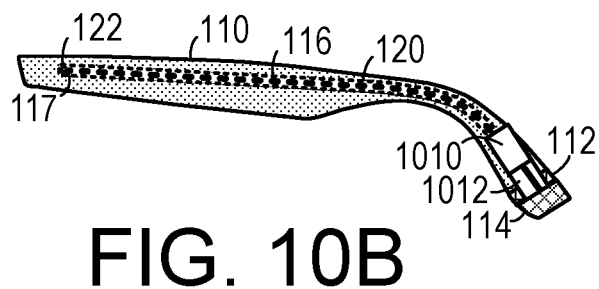

As shown in FIGS. 10A and 10B, one embodiment can include a release mechanism that allows removal and replacement of the cords 116. The embodiment shown, includes a slidable door 1010 that has a closed position (shown in FIG. 10A) and an open position (shown in FIG. 10B) that exposes a hole 1012 that is large enough to allow the stopper 122 to exit the channel 120. As will be readily appreciated by those of skill in the art, many other cord release mechanisms can be employed. This embodiment could allow the switching out of cords of different colors and textures.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. An eyeglass retainer system for use with eyeglasses having a frame front, comprising:
    (a) a pair of eyeglass temples, each temple having a first end for securing the temple to frame front and an opposite second end, each temple defining an elongated channel passing therethrough and opening to the second end;
    (b) two cords, each disposed within the channel defined by a different one of the temples and extending out from the second end, each cord being extendable from the channel and retractable into the channel, each cord having a distal end disposed within the channel that is not affixed to the temples so that the distal end is free to move within the channel;

(c) two magnetic connectors, each affixed to a different one of the cords, the two magnetic connectors having opposite polarities so as to attract each other when placed against to each other; and (d) a stopping mechanism that prevents the distal end of the cord from exiting the elongated channel completely.

2. The eyeglass retainer system of claim 1, further comprising two magnetic holding pieces, each holding piece affixed to the second end of a different one of the temples and each holding piece defining a hole that is contiguous with the channel passing therethrough, the magnetic holding pieces configured to attract the magnetic connectors when placed adjacently thereto.

3. The eyeglass retainer system of claim 2, wherein the stopping mechanism includes:
(a) a stopper that is affixed to a distal end of the cord and that has a diameter; and
(b) a hole defined by the magnetic holding piece, in which the hole has a diameter that is smaller than the diameter of the stopper.

4. The eyeglass retainer system of claim 1, wherein the magnetic connectors are shaped so as to be contiguous with the temples.

5. The eyeglass retainer system of claim 1, wherein the magnetic connectors each comprise rare earth magnets.

6. The eyeglass retainer system of claim 1, further comprising a cap hingedly attached to the second end of each temple, wherein each magnetic connector is configured to fit inside a void defined by the channel and the cap when the cap is closed against the second end of the temple.

7. The eyeglass retainer system of claim 1, further comprising a hollow tube retractably disposed within the channel and configured to extend partially out of the channel, the cord passing through the hollow tube.

8. The eyeglass retainer system of claim 1, wherein each magnetic connector includes a first magnetic part and a second magnetic part, the first magnetic part spaced apart from the second magnetic part by a spacer.

9. The eyeglass retainer system of claim 1, wherein one of the magnetic connectors includes a protuberance extending therefrom and wherein the other one of the magnetic connectors defines an indentation that is complementary in shape to the protuberance.

10. An eyeglass retainer system for use with eyeglasses having a frame front, comprising:
(a) a pair of eyeglass temples, each temple having a first end for securing the temple to frame front and an opposite second end, each temple defining an elongated channel passing therethrough and opening to the second end;
(b) two cords, each disposed within the channel defined by a different one of the temples and extending out from the second end, each cord being extendable from the channel and retractable into the channel;
(c) two magnetic connectors, each affixed to a different one of the cords, the two magnetic connectors having opposite polarities so as to attract each other when placed against to each other;

(d) two magnetic holding pieces, each holding piece affixed to the second end of a different one of the temples and each holding piece defining a hole that is contiguous with the channel passing therethrough, the magnetic holding pieces configured to attract the magnetic connectors when placed adjacently thereto;

(e) a stopper that is affixed to a distal end of the cord and that has a diameter; and (f) a hole defined by the magnetic holding piece, in which the hole has a diameter that is smaller than the diameter of the stopper.

11. The eyeglass retainer system of claim 10, wherein the magnetic connectors are shaped so as to be contiguous with the temples.

12. The eyeglass retainer system of claim 10, wherein the magnetic connectors each comprise rare earth magnets.

13. The eyeglass retainer system of claim 10, wherein one of the magnetic connectors includes a protuberance extending therefrom and wherein the other one of the magnetic connectors defines an indentation that is complementary in shape to the protuberance.

14. An eyeglass retainer system for use with eyeglasses having a frame front and a pair of eyeglass temples, each temple having a first end hingedly secured to the frame front and an opposite second end, comprising:
(a) two cords, each having a proximal end and an opposite distal end;
(b) an attachment mechanism that selectively secures the proximal end of each cord to a different second end of each temple;
(c) two magnetic connectors, each affixed to the distal end of a different one of the cords, the two magnetic connectors configured to be secured to each other by magnetic attraction;
(d) a pair of first magnetic attachment tabs, each of which is configured to be attached to the second end of a different temple; and
(e) a pair of complementary second magnetic attachment tabs, each of which is coupled to the proximal end of a different one of the cords, each second magnetic attachment tab configured to be held to a different one of the first magnetic attachment tabs by magnetic attraction.

15. The eyeglass retainer system of claim 14, wherein first magnetic attachment tab includes a pressure sensitive adhesive applied thereto to facilitate attachment to the temple.

16. The eyeglass retainer system of claim 14, wherein each first magnetic attachment tab has a shape that is complimentary to each second magnetic attachment tab that facilitates positive coupling.

17. The eyeglass retainer system of claim 14, wherein the magnetic connectors each comprise rare earth magnets.

18. The eyeglass retainer system of claim 14, wherein one of the magnetic connectors includes a protuberance extending therefrom and wherein the other one of the magnetic connectors defines an indentation that is complementary in shape to the protuberance.

* * * * *